March 3, 1959 G. R. WINRAM 2,876,417
VOLTAGE-DIVIDER SYSTEM
Filed March 19, 1953
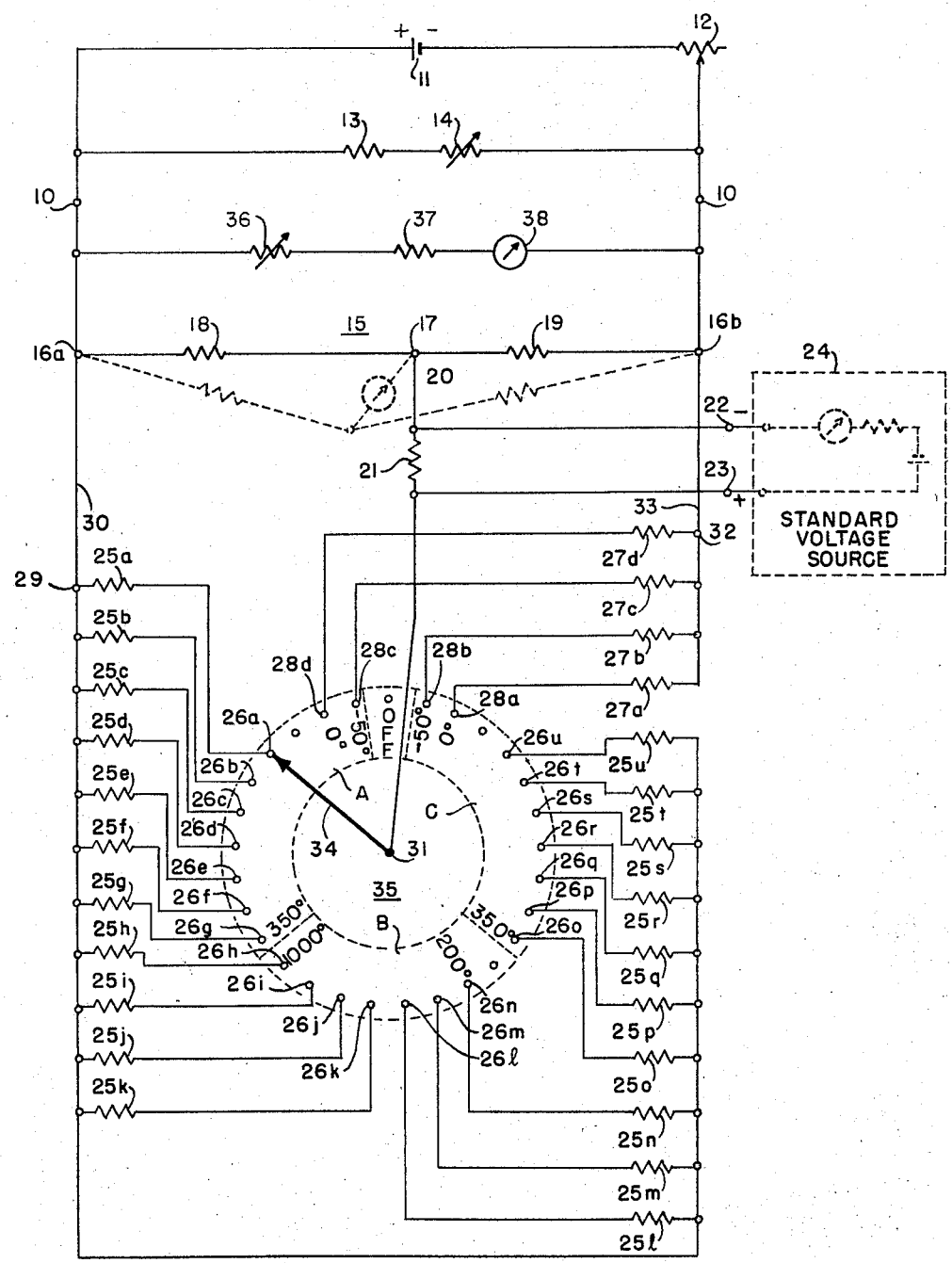

United States Patent Office 2,876,417
Patented Mar. 3, 1959

2,876,417

VOLTAGE-DIVIDER SYSTEM

George R. Winram, New York, N. Y., assignor to Telectro Industries Corp., Long Island City, N. Y., a corporation of New York Application March 19, 1953, Serial No. 343,421

8 Claims. (Cl. 324—76)

General

The present invention relates to a voltage-divider system for deriving selected ones of a plurality of voltages. More particularly, the invention is directed to a system for accurately and quickly deriving selected ones of a plurality of unidirectional voltages having magnitudes which are ordinarily small fractions of 1 volt. Although the invention has a wide range of applications, it has particular utility for testing various types of thermometer indicators such as those used together with sensing units of the bimetallic type. Accordingly, the invention will be described in that environment.

Industrial and military applications sometimes require the testing of bimetallic thermometer indicators of different types over their expected operating range. Testing such indicators using the voltage derived from heating their companion bimetallic sensing units to the precise various temperatures at which it is required to check calibrations is manifestly a slow and unsatisfactory procedure. However, the testing of such thermometer indicators may be accomplished by selectably applying thereto, from a voltage-divider system, individual ones of a plurality of accurately determined unidirectional voltages having values within a range of, for example, from a fraction of a millivolt to about 45 millivolts. The values of the test voltages required depend upon the type of thermocouple indicator to be tested that, in turn, depends on the type of materials which comprise the dissimilar metals of the thermocouple. Representative thermocouples of the type used with the indicators under consideration employ bimetallic elements of iron-constantan, copper-constantan, and Chromel-Alumel.

A prior voltage-divider system for testing such thermometer indicators employs a length of resistive wire having its ends arranged for connection via a current-limiting resistor to a unidirectional voltage source such as a battery capable of delivering a relatively constant voltage of about 4 volts. A plurality of closely spaced taps intermediate the ends of resistive wire are utilized to pick off unidirectional voltages which are a small fraction of a volt. During the manufacture of the voltage divider, the location of each tapping point along the resistive wire is established by sliding the tap connection to the exact point, found experimentally and with the aid of a suitable measuring instrument such as a Wheatstone bridge or potentiometer, and then making a fixed connection at that point by suitable means such as by soldering. These many accurate measurements and rather delicate soldering operations require the painstaking efforts of a skilled workman and, manifestly, increase the cost of the finished product. Frequently individual soldering operations impair the accuracy of the setting of adjacent or other taps since the small globules of solder required to complete the joints or taps modify the resistance of the incremental and aggregated lengths of the resistive wire. Consequently, it is necessary to recheck the resistance between adjacent joints with the Wheatstone bridge in order to determine whether resistance between the completed joints is of the proper value. Obviously, when it becomes necessary to unsolder and resolder some of the taps to reestablish the correct tap positions, slow production from a skilled workman results. Residual solder on a wire from an unsoldering operation and the presence of the usual closely spaced globules of solder at the tapping points undesirably alter the desired uniform characteristic of the length of resistive wire. Experience has indicated that the lower the output voltage to be derived from portions of a prior such divider, the more inaccurate the divider proved to be for the purpose under consideration.

For some applications it is required that a voltage-divider system for testing thermocouple thermometer indicators be capable of providing satisfactory operation over an ambient range of from −40° centigrade to +70° centigrade or greater. The performance of prior voltage-divider systems employing a plurality of soldered taps as described above has not been stable over a range of ambient temperatures considerably smaller than the wide range indicated above. This is probably due to a varying temperature coefficient of resistance for the entire voltage-divider assembly. Aging of the soldered joints of prior devices of the type mentioned above also has caused the accuracy of such dividers to deteriorate with time so that their usefulness was further impaired.

It is an object of the invention, therefore, to provide a new and improved voltage-divider system which avoids one or more of the above-mentioned disadvantages of prior such systems.

It is another object of the invention to provide a new and improved voltage-divider system which is relatively simple in construction, lends itself readily to manufacture by mass-production techniques, and is therefore relatively inexpensive to manufacture.

It is a further object of the invention to provide a new and improved voltage-divider system which is characterized by its relatively high stability and accuracy over a wide range of ambient temperatures.

It is an additional object of the invention to provide a new and improved voltage-divider system which employs readily available and relatively inexpensive replaceable components of good stability.

It is a still further object of the invention to provide a new and improved voltage-divider system which is not subject to excessive deterioration as a result of aging of the components thereof.

In accordance with a particular form of the invention, a voltage-divider system for deriving selected ones of a plurality of voltages comprises means for supplying a voltage of substantially constant amplitude, a resistive impedance having remote terminals coupled to said supply means and having an intermediate terminal providing resistive portions of predetermined values between said terminals. The voltage-divider system also includes an output resistor of a predetermined value having a first output terminal connected to said intermediate terminal and having a second output terminal. The system further comprises a selector apparatus connected to the aforesaid remote terminals and the aforesaid second terminal and including a plurality of resistors of different predetermined values and switching means for selectably connecting individual ones of said plurality of resistors in circuit with said output resistor. The system additionally includes a series circuit including a meter and an adjustable resistor connected between the aforesaid remote terminals for measuring the voltage therebetween.

For a better understanding of the present invention, together with other and further objects thereof, reference is made to the following description taken in connection with the accompanying drawing, and its scope will be pointed out in the appended claims.

The drawing is a circuit diagram of a voltage-divider system in accordance with the present invention.

Description of voltage-divider system

Referring now to the drawing, the voltage-divider system there represented includes a means for supplying a voltage of substantially constant amplitude. This means comprises a pair of input terminals 10, 10 and may also include a voltage source such as a battery 11 capable of delivering a relatively steady unidirectional voltage through an adjustable resistor 12 to the terminals 10, 10. The resistor 12 constitutes the coarse voltage-control element of a voltage-control apparatus which preferably also includes a fine voltage control comprising the series combination of a resistor 13 and an adjustable resistor 14 connected between the terminals 10, 10.

The voltage-divider system also includes a resistive impedance 15 having remote terminals 16a, 16b coupled to the input terminals 10, 10 and having an intermediate terminal 17 accurately positioned with respect to the remote terminals and providing therebetween resistive portions 18 and 19 having a predetermined resistance ratio. In particular, the impedance 15 comprises two precision resistors 18 and 19 electrically joined by a short wire of relatively low resistance. Connection 17 is so located on the wire as to enable a very precise effective resistance ratio of the resistances of resistors 18 and 19 to be obtained. A convenient resistance ratio of the two portions 18 and 19 is selected, such as 9/1, and the position of the intermediate terminal 17 is also accurately selected and made to a connection 20 in the well-known manner by means of a Wheatstone bridge circuit (represented in phantom) followed by a soldering operation. For a practical embodiment of the invention, the resistors 18 and 19 may have nominal values such as 4.5 and 0.5 ohms, respectively, and the joining wire .005 ohm. Accordingly, voltages of different magnitudes are developed across the resistors 18 and 19 for use in a manner to be explained subsequently.

The voltage-divider system further includes an output resistor 21 of a predetermined value having a first output terminal 22 connected to the intermediate terminal 17 by way of the connection 20 and having a second output terminal 23. The terminals 22 and 23 are employed to connect the voltage-divider system during one stage of its manufacture to a conventional standard voltage source 24, represented in broken-line construction, which is capable of delivering to the terminals 22, 23 selected unidirectional voltages of accurately established values. Details of this step in the manufacture of the system will be explained subsequently. In the actual use of the system, the output terminals 22, 23 are also adapted to be connected to the bimetallic thermometer indicator which is to be tested over its operating range to determine its accuracy. This procedure will also be explained hereinafter.

The voltage-divider system also comprises a selector apparatus connected to the remote terminals 16a, 16b and the second terminal 23 of the output resistor 21 and including a plurality of resistors of different predetermined values and a switching means 35 for selectably connecting individual ones of the plurality of resistors in circuit with the output resistor 21. In accordance with a particular embodiment of the invention, a first plurality of resistors 25a–25u, inclusive, of different values and having a common terminal, identified for convenience by the reference numeral 29, is connected to one of the remote terminals, specifically to the terminal 16a through a connection 30. These resistors also have individual terminals 26a–26u, inclusive, preferably arranged rather uniformly about an arc and at uniform radial distances from a central point 31 for a purpose which will be made clear hereinafter. The selector apparatus further includes a second plurality of resistors 27a–27d, inclusive, of different predetermined values having a common terminal 32 connected to the other of the remote terminals 16b through a connection 33 and having individual terminals 28a–28d, inclusive, oriented in a manner similar to that of the other individual terminals 26a–26u, inclusive. The proportioning of the sizes of the individual resistors of the two pluralities thereof just mentioned in relation to the resistors 18, 19, and 21 will be considered subsequently.

The switching means 35 of the selector apparatus comprises a movable switch having a switch blade 34 rotatable about the central point 31 for selective engagement with individual ones of the terminals 26a–26u, inclusive, and 28a–28d, inclusive, which effectively serve as switch points. Several unconnected switch points appear in the plurality of switch points and these may conveniently serve as "off" positions for the switch arm 34. The arcuate arrangement of switch points is effectively disposed into three groups represented by the broken-line sectors A, B, and C. The switch points of sector A are selectively connected in circuit with the output resistor 21 by counterclockwise rotation of the switch blade 34 from the point labeled 28c for the purpose of testing thermocouple indicators used with thermocouples of the iron-constantan type over an operating range of −50° centigrade to +350° centigrade. Similarly, those of sector B may be employed for testing thermocouple indicators used with thermocouples of the Chromel-Alumel type over a range of from 1000° centigrade to 200° centigrade, whereas those of sector C are utilized for testing thermocouple indicators used with thermocouples of the copper-constantan type over the range of from 350° centigrade to −50° centigrade. The arrangement of the individual resistors is such that the direction of current flow through the resistors 27a–27d, inclusive, is opposite to that for the resistors 25a–25u, inclusive.

The various resistors may be conventional elements which are readily obtainable on the market today at other than premium prices. The resistors 25a–25u, inclusive, 27a–27d, inclusive, and 21 may, for example, be wire-wound resistors of high stability which are readily obtainable in precise values and at a relatively low cost. The resistors 18 and 19 may also be of a similar type although their ohmic ratio is assured accurate to a very high degree by the adjustment of point 17 along the interconnecting wire. This assures precisely determined voltages between the terminals 16a and 17 and also between the terminals 17 and 16b. The accuracy of the various output voltages developed across the resistor 21 then primarily depends on the accuracy of the last-mentioned resistor and those associated with the switching means 35.

Experience with thermocouple thermometers of a given design has indicated that heating the bimetallic elements to predetermined temperatures is effective to develop at the junctions of the dissimilar metals voltages of predetermined values. Consequently, it is possible to test or calibrate in terms of temperature the sensitive direct-current microammeters which are associated with the thermocouples by applying a known unidirectional potential to the terminals of the thermocouple indicator. The voltage-divider system is effective to apply accurately determined voltages to its terminals 22, 23 for such test purposes. The values of the resistors 18, 19, and 12 are ordinarily selected so that, with the particular battery 11 which is employed, the desired voltages appear between the terminals 16a, 17, and 16b. In a particular embodiment of the invention, the resistors 18 and 19 may have, for example, accurately determined resistances of 4.5 and 0.5 ohms, respectively, with respective voltages of 0.9 and 0.1 volt developed thereacross. The resistor 21 may be selected with as low a resistance value as is consistent with stability such as one of the order of 2 ohms, and a resistor such as the resistor 25h, which has the lowest value of the two pluralities of resistors associated with the switch blade 34, is selected to have a resistance producing across the output resistor 21 the maximum voltage required for testing the thermocouple indicators. To this end, with one volt applied to the terminals 10, 10 the value of the resistor 25h may be selected in accordance with the formula:

$$R_{25h} = \frac{\frac{1000 R_{21}}{mv} - R_{21}\left(1+\frac{R_{19}}{R_{18}}\right) - R_{19}}{1+\frac{R_{19}}{R_{18}}}$$

where $R_{25h}$ = resistance of resistor 25h
$R_{21}$ = resistance of resistor 21 including the effect of the external load used in service such as an indicator under test
$R_{19}$ = resistance of resistor 19
$R_{18}$ = resistance of resistor 18
$mv$ = desired voltage across $R_{21}$ in millivolts Similarly, by substituting in the equation above for the term $mv$ the voltage required across the terminals 22, 23 for other positions of the switch blade 34 and, hence, for other thermocouple temperatures or types to be simulated, the values of the other resistors of the plurality 25a–25u, inclusive, may be obtained. Since the resistors 27a–27d, inclusive, have their common terminal connected to the remote terminal 16b which is of negative polarity, their values may be calculated in the same manner but the positions of $R_{19}$ and $R_{18}$ are reversed where they appear in the formula.

The voltage-divider system further includes a series circuit including an adjustable resistor 36, a fixed resistor 37, and a current-indicating meter 38 connected between the remote terminals 16a, 16b.

*Operation of voltage-divider system*

Before considering the operation of the voltage-divider system it will be helpful to consider the manner in which it is adjusted at the factory. It will be assumed initially that the battery 11 is connected with the polarity indicated and that the point corresponding to the terminal 17 on the resistive impedance 15 has been established accurately with a Wheatstone bridge as previously described so as to provide a suitable ratio such as 9/1 for the resistance values of resistors 18 and 19. It will also be assumed that adjustment of the coarse and fine voltage controls 12 and 14 is effective to cause the battery 11 to supply a suitable voltage such as about 1 volt to the terminals 16a, 16b. A standard voltage source 24 including a suitable null balance detecting device is connected to the terminals 22, 23 with the polarity indicated and the switch blade 34 is connected to a suitable switch point such as terminal 26h. It is known that with the switch blade in that position and during actual use of the voltage divider for operational purposes, there will be developed across its output terminals 22, 23 a predetermined voltage such as 41.31 millivolts, which represents the maximum output voltage required from the terminals 22, 23. Accordingly, the source 24 is accurately adjusted in the well-known manner so that it delivers an output voltage of 41.31 millivolts. Then, the coarse and fine resistor controls 12 and 14 are adjusted so as to energize the divider system exactly the required amount such that no current is indicated by the null detector part of unit 24. During this condition the voltage output from the system across resistor 21 is equal to that of the preset standard 24, namely, 41.31 millivolts. While maintaining the balanced condition described, the resistor 36 in the series circuit connected between the terminals 10, 10 is adjusted until the needle of the meter rests on the red line or other suitable scale reference position. This setting of the adjustable resistor 36 is essential to compensate for meter manufacturing tolerances and remains a permanent factory adjustment and assures that the voltage then developed across the resistive impedance 15 is the precise requirement for all switch positions where the resistors 25a–25u, inclusive, have been calculated by the formula given above. Thereafter, the voltage source 24 is disconnected from the output terminals 22, 23 and the system is ready for use in testing bimetallic thermometer indicators.

It will now be assumed that the system is to be used for a commercial testing application and a suitable voltage source such as the battery 11 and the voltage-control apparatus 12, 13, and 14 are connected to the terminals 10, 10. With the switch blade 34 connected to the switch point 26h, one or more of the resistors 12 and 14 are first adjusted until the needle of the meter 38 rests on the redline or other scale reference position, as the case may be, thus indicating that the required test voltage is developed across the resistive impedance 15 for developing across the resistor 21 the maximum voltage of 41.31 millivolts required thereacross.

With the switch blade 34 connected to the switch point 26h and a thermometer indicator of the type used with a Chromel-Alumel thermocouple connected to the terminals 22, 23, the thermometer indicator may be tested for operation at a simulated 1000° centigrade. When the switch blade 34 is connected to successive ones of the terminals 26i–26n, inclusive, the progressively greater resistors 25i–25n, inclusive, are successively placed in circuit with the resistor 21 thus successively reducing the current flowing through the selected resistor and the resistor 21 in the series circuit between the terminals 16a and 17. As a result, the voltage developed across the resistor 21 for application to the thermometer indicator connected to the terminals 22, 23 is reduced, thereby energizing the thermometer indicator at successively reduced levels simulating lower thermocouple temperatures and enabling tests on the indicator to be completed.

The thermometer indicator used with Chromel-Alumel thermocouples may be disconnected from the terminals 22, 23 and an indicator used with copper-constantan thermocouples connected thereto. Thereafter it may be tested by selectively connecting the switch blade to individual ones of the switch points 26o–26u, inclusive, thereby applying to the output terminals 22, 23 predetermined voltages effective to test the indicator at the equivalent of thermocouple temperatures from 350° centigrade to −50° centigrade. When the switch blade is connected to the switch points 28a and 28b, terminals 17 and 16b supply approximately 0.1 volt to the circuit including the resistor 21, the selected one of the resistors 27a and 27b, the direction of current flow now being opposite to that previously existing and thus in a direction from the terminal 17 to the switch arm 34. The requirements of the copper-constantan thermometers are such that temperatures below the normal ambient of the "cold" thermocouple junction have to be registered on the indicator. This condition causes a current of opposite to normal flow direction to originate from the thermocouple and, consequently, requires a simulated testing voltage similarly of opposite to normal flow direction. It will be seen, therefore, that the voltage-divider system is able to develop across the resistor 21 voltages of predetermined value and of opposite polarity as required.

Thermocouple indicators used with iron-constantan thermocouples are tested in a manner similar to that just described by adjustment of the switch blade over the switch points 28c, 28d, and 26a–26g, inclusive.

Resistors selectively connected in circuit by the switch blade 34 may be readily obtained which are accurate to ±0.125 percent or less. In fact, guaranteed tolerances of ±0.01 percent and ±0.003 percent are not uncommon, thus assuring great accuracy of the required voltages developed across the resistor 21 for the various positions of adjustment of the switch blade 34. Initial inaccuracies of the order of ±1 percent in the ohmic value of the resistor 21 do not have serious consequences regarding the precision of the voltages developed across the terminals 22 and 23. This is because the standardizing procedure with the meter 38 already described automatically adjusts for such variations in the initial value of the resistor 21. As a result, the difficulties normally associated with the production and utilization of low-value resistors of high ohmic precision are eliminated.

While applicant does not wish to be limited to any particular values for the various circuit elements, the following circuit constants were found useful in a practical embodiment of the invention:

| | |
|---|---|
| Battery 11 | 1.5 volts |
| Resistor 12 | 2.5 ohms (max.) |
| Resistor 13 | 100 ohms |
| Resistor 14 | 47 ohms (max.) |
| Resistor 18 | 4.5 ohms |
| Resistor 19 | 0.5 ohm |
| Resistor 21 | 1.438 ohms |
| Resistor 25a | 757.80 ohms |
| Resistor 25b | 278.90 ohms |
| Resistor 25c | 168.98 ohms |
| Resistor 25d | 120.68 ohms |
| Resistor 25e | 93.57 ohms |
| Resistor 25f | 76.46 ohms |
| Resistor 25g | 64.54 ohms |
| Resistor 25h | 27.97 ohms |
| Resistor 25i | 35.26 ohms |
| Resistor 25j | 40.69 ohms |
| Resistor 25k | 48.04 ohms |
| Resistor 25l | 58.47 ohms |
| Resistor 25m | 74.28 ohms |
| Resistor 25n | 152.27 ohms |
| Resistor 25o | 69.42 ohms |
| Resistor 25p | 84.54 ohms |
| Resistor 25q | 106.63 ohms |
| Resistor 25r | 141.54 ohms |
| Resistor 25s | 204.60 ohms |
| Resistor 25t | 348.24 ohms |
| Resistor 25u | 976.70 ohms |
| Resistor 27a | 169.70 ohms |
| Resistor 27b | 50.06 ohms |
| Resistor 27c | 35.64 ohms |
| Resistor 27d | 127.10 ohms |
| Resistor 36 | 60 ohms (max.) |
| Resistor 37 | 920 ohms |
| Output voltage at terminals 22, 23 | From about +42 millivolts to −3.57 millivolts |

From the foregoing description it will be clear that a voltage-divider system in accordance with the present invention is capable of developing each of a plurality of accurately determined voltages. It will also be apparent that it is adapted to employ easily obtainable and relatively inexpensive resistor elements of high stability and accuracy. Unlike prior such voltage-divider systems, the present system is characterized by its accurate performance over a wide range of ambient temperatures because of the use of homogeneous resistors and freedom from a multiplicity of critical connections which may be subject to aging or progressive deterioration. Additionally, a voltage-divider system embodying the present invention is relatively inexpensive to manufacture since it lends itself readily to the use of mass-production techniques.

While there has been described what is at present considered to be the preferred embodiment of this invention, it will be obvious to those skilled in the art that various changes and modifications may be made therein without departing from the invention, and it is, therefore, aimed to cover all such changes and modifications as fall within the true spirit and scope of the invention.

What is claimed is:

1. A voltage-divider system for deriving selected ones of a plurality of voltages comprising: means for supplying a unidirectional voltage of substantially constant amplitude; a resistive impedance having remote terminals coupled to said supply means and having an intermediate terminal accurately positioned with respect to said remote terminals and providing therebetween resistive portions having a predetermined resistance ratio; an output resistor of a predetermined value having a first output terminal connected to said intermediate terminal and having a second output terminal; a plurality of resistors of different predetermined values including a common terminal connected to one of said remote terminals and including a corresponding plurality of individual terminals; switching means including fixed switching points individually connected to said individual terminals and including a movable member connected to said second output terminal for selectably connecting individual ones of said plurality of resistors in circuit with said output resistors; and a series circuit including a current-indicating meter and an adjustable resistor connected between said remote terminals for measuring the voltage therebetween.

2. A voltage-divider system for deriving selected ones of a plurality of voltages comprising: means including voltage-control apparatus for supplying a relatively steady unidirectional voltage; a resistive impedance having remote terminals coupled to said supply means and having an intermediate terminal fixed in position with reference to said remote terminals and providing between said terminals resistive portions having a predetermined resistance ratio; an output resistor of a predetermined value having a first output terminal connected to said intermediate terminal and having a second output terminal; a selector apparatus including a first plurality of resistors of different predetermined values having a common terminal connected to one of said remote terminals, a second plurality of resistors of different predetermined values having a common terminal connected to the other of said remote terminals, and switching means for selectably connecting individual ones of said first and second plurality of resistors to said second output terminal and in circuit with said output resistor; and a series circuit including a meter and an adjustable resistor connected between said remote terminals for measuring the voltage therebetween.

3. A voltage-divider system for deriving selected ones of a plurality of voltages comprising: means for supplying a unidirectional voltage of substantially constant amplitude; a resistive impedance having remote terminals coupled to said supply means and having an intermediate terminal fixed in position with reference to said remote terminals and providing resistive portions of predetermined values between said terminals; an output resistor of a predetermined value having a first output terminal connected to said intermediate terminal and having a second output terminal; a selector apparatus including a first plurality of resistors of different predetermined values having a common terminal connected to one of said remote terminals, a second plurality of resistors of different predetermined values having a common terminal connected to the other of said remote terminals, and switching means for selectably connecting individual ones of said first and second plurality of resistors to said second output terminal and in circuit with said output resistor; and a series circuit including a meter and an adjustable resistor connected between said remote terminals for measuring the voltage therebetween.

4. A voltage-divider system for deriving selected ones of a plurality of voltages comprising: a source of unidirectional voltage of substantially constant amplitude; a resistive impedance having remote terminals coupled to said source and having an intermediate terminal fixed in position with reference to said remote terminals and providing resistive portions of predetermined values between said terminals; an output resistor of a predetermined value having a first output terminal connected to said intermediate terminal and having a second output terminal; a selector apparatus including a first plurality of resistors of progressively greater predetermined values having a common terminal connected to one of said remote terminals, a second plurality of resistors of different predetermined values having a common terminal connected to the other of said remote terminals, and switching means for selectably connecting individual ones of said plurality of resistors to said second output terminal and in circuit with said output resistor; said source being selected to supply across said output resistor, with the smallest value resistor of said plurality of resistors connected in circuit with said output resistor, the largest desired value of output voltage; and a series circuit including a meter and an adjustable resistor connected between said remote terminals for measuring the voltage therebetween.

5. A voltage-divider system for deriving selected ones of a plurality of voltages comprising: means for supplying a unidirectional voltage of substantially constant amplitude; a resistive impedance having remote terminals coupled to said supply means and having an intermediate terminal fixed in position with reference to said remote terminals and providing resistive portions of predetermined values between said terminals; an output resistor of a predetermined value having a first output terminal connected to said intermediate terminal and having a second output terminal; a first plurality of resistors of different predetermined values having a common terminal connected to one of said remote terminals and having individual terminals and a second plurality of resistors of different predetermined values having a common terminal connected to the other of said remote terminals and having individual terminals; a movable switch having individual switch points effectively connected to individual ones of said individual terminals and having a member connected to said second output terminal and movable selectably to connect individual ones of said plurality of resistors in circuit with said output resistor; and a series circuit including a meter and an adjustable resistor connected between said remote terminals for measuring the voltage therebetween.

6. A voltage-divider system for deriving selected ones of a plurality of voltages comprising: means for supplying a unidirectional voltage of substantially constant amplitude; a resistive impedance having remote terminals coupled to said supply means and having an intermediate terminal accurately and fixedly positioned with respect to said remote terminals and providing therebetween resistive portions having a predetermined resistance ratio; an output resistor of a predetermined value having a first output terminal connected to said intermediate terminal and having a second output terminal; a first plurality of resistors of different predetermined values having a common terminal connected to one of said remote terminals and having individual terminals and a second plurality of resistors of different predetermined values having a common terminal connected to the other of said remote terminals and having individual terminals; a movable switch having individual switch points connected to individual ones of said individual terminals and having a member connected to said second output terminal and movable selectably to connect individual ones of said plurality of resistors in circuit with said output resistor; and a series circuit including a meter and an adjustable resistor connected between said remote terminals for measuring the voltage therebetween.

7. A voltage-divider system for deriving selected ones of a plurality of voltages comprising: means for supplying a unidirectional voltage of substantially constant amplitude; a resistive impedance having remote terminals coupled to said supply means and having an intermediate terminal accurately and fixedly positioned with respect to said remote terminals and providing therebetween resistive portions of relatively low values and having a predetermined resistance ratio; an output resistor having a first output terminal connected to said intermediate terminal and having a second output terminal; a first plurality of resistors of different predetermined values much greater than that of either of said portions and having a common terminal connected to one of said remote terminals and having individual terminals and a second plurality of resistors of different predetermined values much greater than that of either of said portions and having a common terminal connected to the other of said remote terminals and having individual terminals; a movable switch having individual switch points connected to individual ones of said individual terminals and having a member connected to said second output terminal and movable selectably to connect individual ones of said plurality of resistors in circuit with said output resistor; and a series circuit including a meter and an adjustable resistor connected between said remote terminals for measuring the voltage therebetween.

8. A voltage-divider system for deriving selected ones of a plurality of voltages comprising: means for supplying a unidirectional voltage of substantially constant amplitude; a resistive impedance having remote terminals coupled to said supply means and having an intermediate terminal accurately and fixedly positioned with respect to said remote terminals and providing therebetween resistive portions having a predetermined resistance ratio; an output resistor of a predetermined value having a first output terminal connected to said intermediate terminal and having a second output terminal; a first plurality of resistors of different predetermined values having a common terminal connected to one of said remote terminals and having individual terminals and a second plurality of resistors of different predetermined values having a common terminal connected to the other of said remote terminals and having individual terminals, the value of individual ones of said first plurality of resistors, with one volt applied to said remote terminals, being determined by the relation $$R_{25} = \frac{\frac{1000 R_{21}}{mv} - R_{21}\left(1 + \frac{R_{19}}{R_{18}}\right) - R_{19}}{1 + \frac{R_{19}}{R_{18}}}$$

and the value of individual ones of said second plurality of resistors being determined by the relation $$R_{25} = \frac{\frac{1000 R_{21}}{mv} - R_{21}\left(1 + \frac{R_{18}}{R_{19}}\right) - R_{18}}{1 + \frac{R_{18}}{R_{19}}}$$

where $R_{25}$ is the desired value of said individual ones of said resistors, $R_{21}$ is the resistance of said output resistor including the effect of any external load resistance, such as an indicator under test, connected across said output resistor during operation of the system, $R_{19}$ is the resistance of said resistive portion connected to said other of said remote terminals, $R_{18}$ is the resistance of said resistive portion connected to said one of said remote terminals, and $mv$ is the desired voltage in millivolts across said output resistor for the selected one of said plurality of resistors $R_{25}$ connected in circuit by said switch;

a movable switch having individual switch points connected to individual ones of said individual terminals and having a member connected to said second output terminal and movable selectably to connect individual ones of said plurality of resistors in circuit with said output resistor; and a series circuit including a meter and an adjustable resistor connected between said remote terminals for measuring the voltage therebetween.

References Cited in the file of this patent

UNITED STATES PATENTS

| | | |
|---|---|---|
| 1,858,267 | Eames | May 17, 1932 |
| 2,277,365 | Michael | Mar. 24, 1942 |
| 2,502,568 | Hulsberg | Apr. 4, 1950 |